United States Patent
Amor et al.

(10) Patent No.: US 6,549,931 B1
(45) Date of Patent: *Apr. 15, 2003

(54) DISTRIBUTING WORKLOAD BETWEEN RESOURCES USED TO ACCESS DATA

(75) Inventors: Patrick A. Amor, Redwood City, CA (US); Benoit Dageville, Redwood Shores, CA (US)

(73) Assignee: Oracle Corporation, Redwood Shores, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/415,033

(22) Filed: Oct. 7, 1999

Related U.S. Application Data (63) Continuation-in-part of application No. 09/406,482, filed on Sep. 27, 1999.

(51) Int. Cl.[7] .......................... G06F 17/30; G06F 9/312
(52) U.S. Cl. ...................... 709/104; 709/105; 707/200; 707/201
(58) Field of Search ................................ 707/200–201, 707/1, 2, 100, 8; 709/104, 105; 711/150

(56) References Cited

U.S. PATENT DOCUMENTS

| | | | |
|---|---|---|---|
| 4,633,387 A | 12/1986 | Hartung et al. ............. 364/200 |
| 4,980,822 A | 12/1990 | Brantley et al. ............ 364/200 |
| 5,307,485 A | 4/1994 | Bordonaro .................. 395/600 |
| 5,325,525 A | 6/1994 | Shan et al. ................. 395/650 |
| 5,592,671 A | 1/1997 | Hirayama et al. .......... 395/650 |
| 5,675,791 A | 10/1997 | Bhide et al. |
| 5,692,182 A | * 11/1997 | Desai et al. ................... 707/2 |
| 5,870,743 A | * 2/1999 | Cohen et al. .................. 707/8 |
| 5,892,945 A | * 4/1999 | Mirchandaney et al. |
| 5,956,704 A | * 9/1999 | Gautam et al. ................ 707/1 |
| 5,970,495 A | 10/1999 | Baru et al. |
| 6,003,036 A | 12/1999 | Martin |
| 6,092,062 A | 7/2000 | Lohman et al. |
| 6,112,198 A | 8/2000 | Lohman et al. ................ 707/3 |
| 6,112,225 A | * 8/2000 | Kraft et al. .................. 709/202 |
| 6,223,182 B1 | 4/2001 | Agarwal et al. ............ 707/102 |
| 6,240,428 B1 | 5/2001 | Yeung et al. ............... 707/206 |
| 6,263,331 B1 | 7/2001 | Liu et al. ...................... 707/4 |

\* cited by examiner

Primary Examiner—John A. Follansbee
Assistant Examiner—Dustin Nguyen
(74) Attorney, Agent, or Firm—Hickman Palermo Truong & Becker LLP; Marcel K. Bingham (57) ABSTRACT

A task is divided into work granules that require access to data objects. The work granules are distributed to slave processes in a manner that causes the data objects to be accessed in a balanced way, such that the difference in the number of slave processes accessing any object is not greater than one. Distributing the work granules in this manner decreases the likelihood that the resources required to access any particular data object will become a bottleneck in performing the task. For each data object in the set of data objects, a work granule list is maintained. The list of each data object identifies work granules requiring access to the data object. A slave process is assigned a work granule selected from a set of work granule lists. To select a work granule for a slave process, an initial list is picked at random. If the quantity of currently-assigned work granules from the selected work granule list is less than or equals a "threshold minimum", then a work granule from the work granule list is assigned to the slave process. If the quantity of work granules is greater than the threshold minimum, then another work granule list is selected. The threshold minimum may be, for example, the minimum number of currently-assigned work granules from the work granule list.

24 Claims, 6 Drawing Sheets

DISTRIBUTING WORKLOAD BETWEEN RESOURCES USED TO ACCESS DATA

This application is a continuation-in-part of application Ser. No. 09/406,482, filed on Sep. 27, 1999, entitled PARALLEL PARTITION-WISE JOINS, by the following named inventor(s): MOHAMED ZAIT, BENOIT DAGEVILLE.

FIELD OF THE INVENTION

The present invention relates to workload balancing, and in particular, to distributing workload between resources used to access a data object.

BACKGROUND OF THE INVENTION

To fully utilize the computing power of a multi-processing system, a larger task (a "parent task") may be divided into smaller tasks ("work granules") which are then distributed to processes ("slave processes") running on one or more processing nodes. Each node in a multi-processing system may contain multiple processors and multiple concurrent processes. The process that divides parent tasks into work granules and distributes the work granules to slave processes on the various processing nodes is referred to herein as the coordinator process.

Databases that run on multi-processing systems typically fall into two categories: shared disk databases and shared nothing databases. A shared disk database expects all disks to be visible to all processing nodes on the computer system on which the database runs. Consequently, a coordinator process in a shared disk database may assign any work granule to a slave process on any node, regardless of the location of the disk that contains the data that will be accessed during the work granule. Shared disk databases may be run on both shared nothing and shared disk computer systems. To run a shared disk database on a shared nothing computer system, software support may be added to the operating system or additional hardware may be provided to allow processes to have direct access to remote disks.

A shared nothing database assumes that a process can only access data if the data is contained on a disk that belongs to the same node as the process. Consequently, a coordinator process in a shared nothing database can only assign a work granule to a slave process if the data to be processed in the work granule resides on a disk in the same node as the process. Shared nothing databases may be run on both shared disk and shared nothing multi-processing systems. To run a shared nothing database on a shared disk machine, a mechanism may be provided for logically dividing the disks so that each of the disks is assigned to a particular node.

The power of database systems that run on multi-processing systems stems from the fact that many processors can be working in parallel on the same task. This power would be wasted, however, if a resource for accessing data, such as a disk controller, became a bottleneck during the parallel execution of the task. For example, assume that a particular parent task requires operations to be performed on data objects that reside on many disks controlled by many disk controllers. The task would be broken up into work granules, each of which would typically require access to data on one of the disks. If the coordinator process initially assigns to all of the slave processes work granules that require access to disks controlled by the same disk controller, then all of the slave processes would have to contend with each other for use of that disk controller. Consequently, that disk controller would become a bottleneck for the task, while the other disk controllers remain idle. In general, the more evenly workload is distributed among access devices, the greater the benefit derived from the parallelism provided by the system architecture. The more skewed the workload distribution, the less efficient the use of the multi-processing system. Ideally, work granules are distributed so all access devices with the same capacity are used at the same rate.

Many factors affect how efficiently a process may execute one work granule relative to other work granules. For example, in a shared database system implemented in a shared nothing computer system, the amount of time required for a process within a node to access data on a disk within the same node (a "local access") is significantly less than the amount of time required for the same process to access data on a disk within another node (a "remote access"). However, under the assumption that processes on all nodes have equal access to all disks, the coordinator process in some shared databases may assign to a slave process running on a particular node a work granule that accesses data in a different node, even though an unexecuted work granule may be available for the node on which the slave process resides.

To prevent workload skew, and to improve overall system performance, work granules may be assigned to slave processes in a manner that accounts for location of data accessed by a work granule. When a work granule is assigned, the coordinator selects, if available for assigning to the work granule, a slave process on a node that may locally access the needed data.

Location of data to be accessed, however, is not the only factor which affects how efficiently a work granule may be executed by a slave process. Another factor that affects how efficiently a work granule may be processed is contention between processes for a device that supplies the needed data. For example, two slave processes on a node may be assigned work granules that require access to different data objects on different disk drives. Although the data objects reside on different disk drives, they may be controlled by the same disk controller. Thus, when the two slave processes execute their assigned work granules, they contend for the same disk controller, interfering with each other and executing less efficiently.

Contention between processes may be avoided by reducing the number of slave processes that concurrently require use of the same resource. However, reducing the number of slave processes that concurrently require use of the same resource may require the system to know which resources would be used during execution of each work granule. Based on this information, a coordinator process could avoid assigning work granules that lead to contention. While information may be available about some resources used to execute a work granule, information may not be available about all resources used to execute the work granules. For example, information about what particular disk controller controls a disk device, or even what disk drive contains a data object, may not be available to a coordinator process assigning the work granules.

Based on the foregoing, it desirable to provide a system that reduces contention between slave processes for resources accessed during execution of work granules, and in particular, a method that reduces contention in the absence of information about which resources are accessed during execution of each of the work granules.

SUMMARY OF THE INVENTION

A method and mechanism are provided for balancing the workload placed on resources used to access a set of data objects.

According to one aspect of the invention, the work granules of a task are distributed to slave processes in an manner that causes the data objects that must be accessed to perform the task to be accessed in a balanced way, such that the difference in the number of slave processes accessing any object is not greater than one. Distributing the work granules in this manner decreases the likelihood that the resources required to access any particular data object will become a bottleneck in performing the task.

In this context, "data object" refers to an identifiable set of data. The actual granularity of the data objects that are used as the basis for distributing work granules may vary from implementation to implementation. For example, one implementation may distribute the work granules of a task in a manner that causes the files that must be accessed to perform the task to be accessed in a balanced way. Another implementation may distribute the work granules of a task in a manner that causes the tables that must be accessed to perform the task to be accessed in a balanced way. Yet another implementation may distribute the work granules of a task in a manner that causes the table partitions that must be accessed to be accessed in balanced way.

According to an aspect of the present invention, a task that requires access to a set of data objects is divided into work granules. For each data object in the set of data objects, a work granule list is maintained. The work granule list of each data object identifies the work granules that require access to the data object.

A slave process is assigned a work granule selected from a set of work granule lists. To select a work granule for a slave process, an initial work granule list with a remaining unassigned granule is picked at random. If the current load of the data object associated with the selected work granule list satisfies a condition, then the slave process is assigned a currently-unassigned work granule from the selected work granule list. Otherwise, the slave process is assigned a currently unassigned work granule from another work granule list.

In one embodiment, for example, if the quantity of currently-assigned work granules from the selected work granule list equals a "threshold minimum", then a work granule from the work granule list is assigned to the slave process. If the quantity of work granules does not match the threshold minimum, then another work granule list is selected. The threshold minimum may be, for example, the minimum number of currently-assigned work granules from the work granule list.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for balancing the workload placed on resources used to access data objects is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Functional Overview

A technique and mechanism is described for balancing the workload placed on resources used to access a set of data objects during the execution of a task. The workload is balanced between the data objects as part of an overall process that divides a task into work granules and dynamically distributes work granules according to "affinity". Affinity is the tendency of a particular work granule to be more efficiently executed on a node relative to other nodes. Specifically, a task is divided into sets of work granules according to the affinity of each work granule and how data to be accessed during the execution of each work granule is organized and stored. Each set of work granules requires access to a set of data objects. For the set of data objects accessed by a set of work granules, the coordinator process assigns the work granules so that the load placed on the data objects, and consequently, the load placed on the resources used to access the data objects, is evenly distributed.

Specifically, for each data object in a set of data objects, a work granule list is maintained. The work granule list of a data object identifies the work granules that require access to the data object. To assign a work granule to a slave process, an initial work granule list is selected at random. If the current load of the data object associated with the work granule list satisfies a condition, then the work granule is assigned from the selected work granule list. In particular, if the quantity of work granules from the selected work granule list that are currently assigned to a slave process for execution is equal to or less than a threshold minimum of slave processes, a work granule from the work granule list is assigned to the slave process. If the quantity of work granules does not match the threshold minimum, then another work granule list is selected. The threshold minimum represents the minimum number of slave processes currently assigned work granules from a work granule list.

Exemplary Database System

Figure 1:
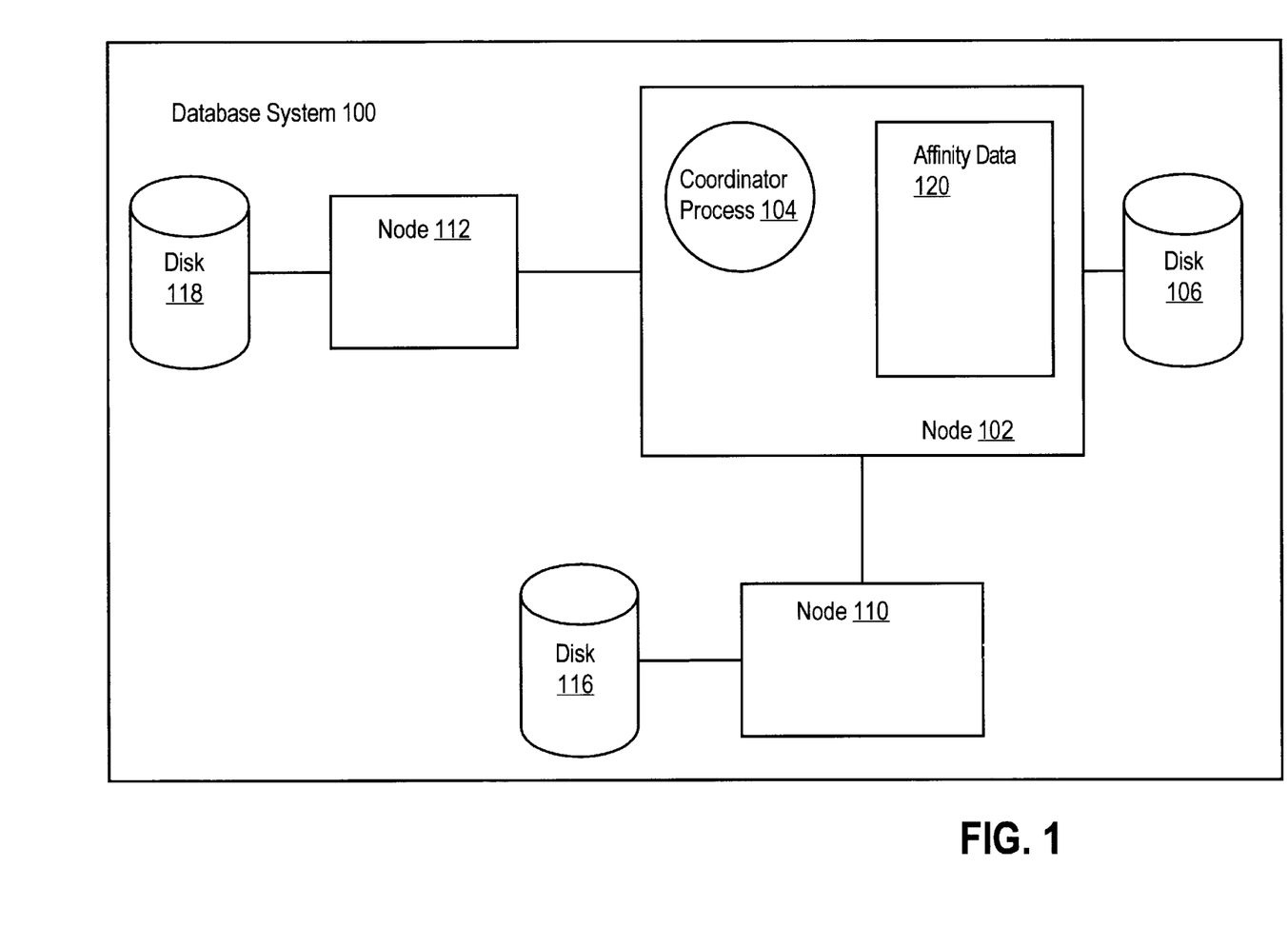
FIG. 1 is a block diagram depicting an exemplary database system upon which an embodiment of the present invention may implemented.

FIG. 1 is a block diagram of a database system 100 upon which an embodiment of the present invention may be implemented. The database system 100 includes three interconnected nodes 102, 110 and 112. Node 102 is connected to disks 106 and is executing a coordinator process 104 for a particular task. Node 110 is connected to disks 116, and node 112 is connected to disks 118. A shared disk mechanism (not shown) allows nodes 102, 110 and 112 to access data on disks that belong to remote nodes.

Coordinator process 104 participates in the management of executing the task in parallel within database system 100. In particular, coordinator process 104 divides the task into work granules, and distributes the work granules to slave processes that may be executing on either of nodes 102, 110, and 112. For example, database system 100 receives a task in the form of query. The coordinator process 104 inspects the query to determine what database objects, including tables and files, must be accessed to perform the task. The coordinator process 104 then divides the task into work granules based on the tables and files that must be accessed.

To generate work granules and distribute the task to them so that the task may be efficiently executed, coordinator process 104 needs information to determine how efficiently a work granule may execute on a node. Such information is stored in affinity data 120. Affinity data 120 includes information such as the number of slave processes running on each of nodes 102, 110, and 112, what disks store particular data objects, which files are used to store particular database tables or other database objects, and the organization of tables and other database objects.

The information contained in affinity data 120 depends on what affinity factors are being used to determine affinity. For example, if processing power of a node is an affinity factor, then affinity data 120 may contain data that specifies the processing power of nodes.

Organization of Data to be Accessed

As mentioned previously, work for a task is divided into work granules based on data accessed by the task. The process of dividing the work into work granules may be performed according to how data to be accessed is organized. How data is organized or stored affects how efficiently slave processes execute work granules. Work may be distributed to work granules in a manner that accounts for how the data to be accessed is organized, generating a set of work granules that are configured to exploit the way data is organized.

Figure 2:
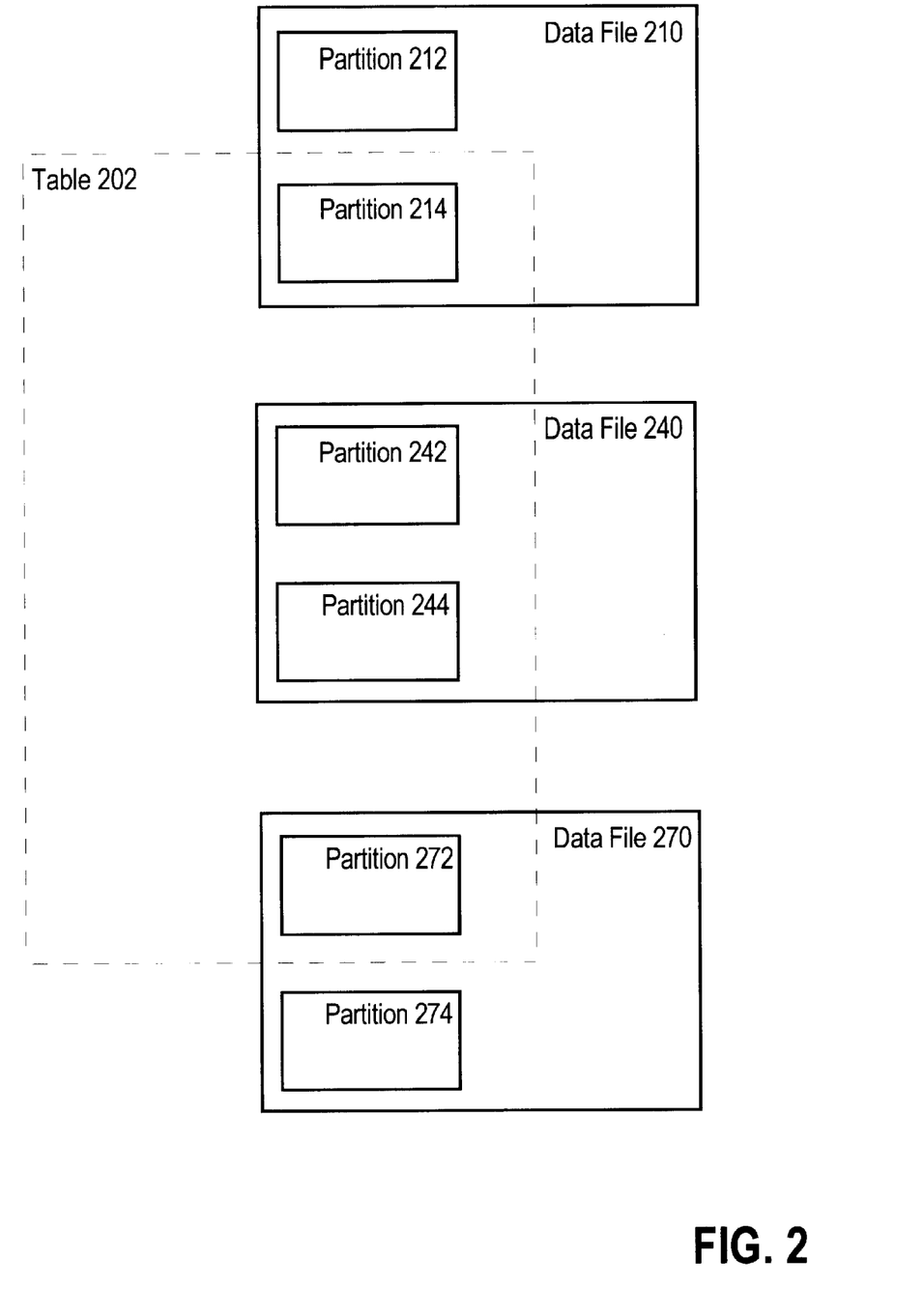
FIG. 2 is a block diagram depicting an organization of data structures used to store data, including a data object, a table, and partitions.

FIG. 2 is a diagram depicting how various tables are stored on disks 106, 108, and 116. Referring to FIG. 2, Files 210, 240, and 270 may reside on separate disks or the same disk. Files 210, 240, and 270 are used to store a portion of table 202. Data file 210 includes partitions 212 and 214, data file 240 includes partitions 242 and 244, and data file 270 contains partitions 272 and 274. Partitions are explained in greater detail below.

Partitions

One technique for organizing tables managed by a database system is referred to as partitioning. With partitioning, an object, such as a database table, is divided up into sub-tables, referred to as "partitions". A common form of partitioning is referred to as range partitioning. With range partitioning, each individual partition corresponds to a particular range of values for one or more columns of the table.

Referring again to FIG. 2, table 202 is partitioned into partition 214, partition 242, partition 244, and partition 272. A column of a table 202 stores date values that fall within a particular year, and table 202 is divided into twelve partitions (not all of them shown), each of which corresponds to a month of that year. All rows that have a particular month in the date column belong to the partition that corresponds to that month. Partition 214 corresponds to January of that particular year, hence all rows with a January date value in the date column are inserted into the partition 214.

Partitioning table 202 in this manner increases the efficiency of processing queries that select rows based on the month contained in the date column. For example, if a particular query selected all rows where month equals January, then only partition 214 would have to be scanned.

Partitions 212 and 274 are partitions for other tables which are not shown.

Work Granule Types

A task may involve one or more operations that are divided into work granules. Types of operations include scanning rows from tables or inserting or updating rows in a partition. For example, a table may be partitioned according to the date value in a column. A query requests data grouped by the partition key column. Because executing the query involves the operation of scanning from partitions, and each of the partitions can be processed individually, the operation of scanning the partitions is divided into work granules according to partition. The operation being divided into work granules may be used to classify work granules.

According to an embodiment of the present invention, work granules may be classified into three work granule types. These include a block range granule type, a partition granule type, and a partition-wise join granule type. A block range granule type is assigned one or more contiguous ranges of blocks to scan from a table. A partition granule type is assigned a partition to scan. A partition-wise join granule type is assigned multiple partitions to scan. A partition-wise join granule type is used to support "mini-joins" between respective partitions of tables being joined.

During execution of a work granule belonging to any of the three work granule Types, a slave process scans rows as assigned. In addition to scanning, the slave process may perform other operations, such as applying a filter to the scanned in rows, and storing rows that satisfy the filter for later use in subsequent operations. Subsequent operations include operations performed by the slave process or other slave processes, such as ordering the rows according to values contained in a particular column.

Establishing the Node Affinity of Work Granules

Before work may be assigned to slave processes based on the affinity of the work granules, the coordinator process 104 establishes the affinity of each of the work granules, if any. Various factors may be used to determine the affinity of a work granule. According to one embodiment, a work granule is considered to have an affinity for a node when a majority of the data to be accessed by the work granule is locally accessible to the node.

Figure 3:
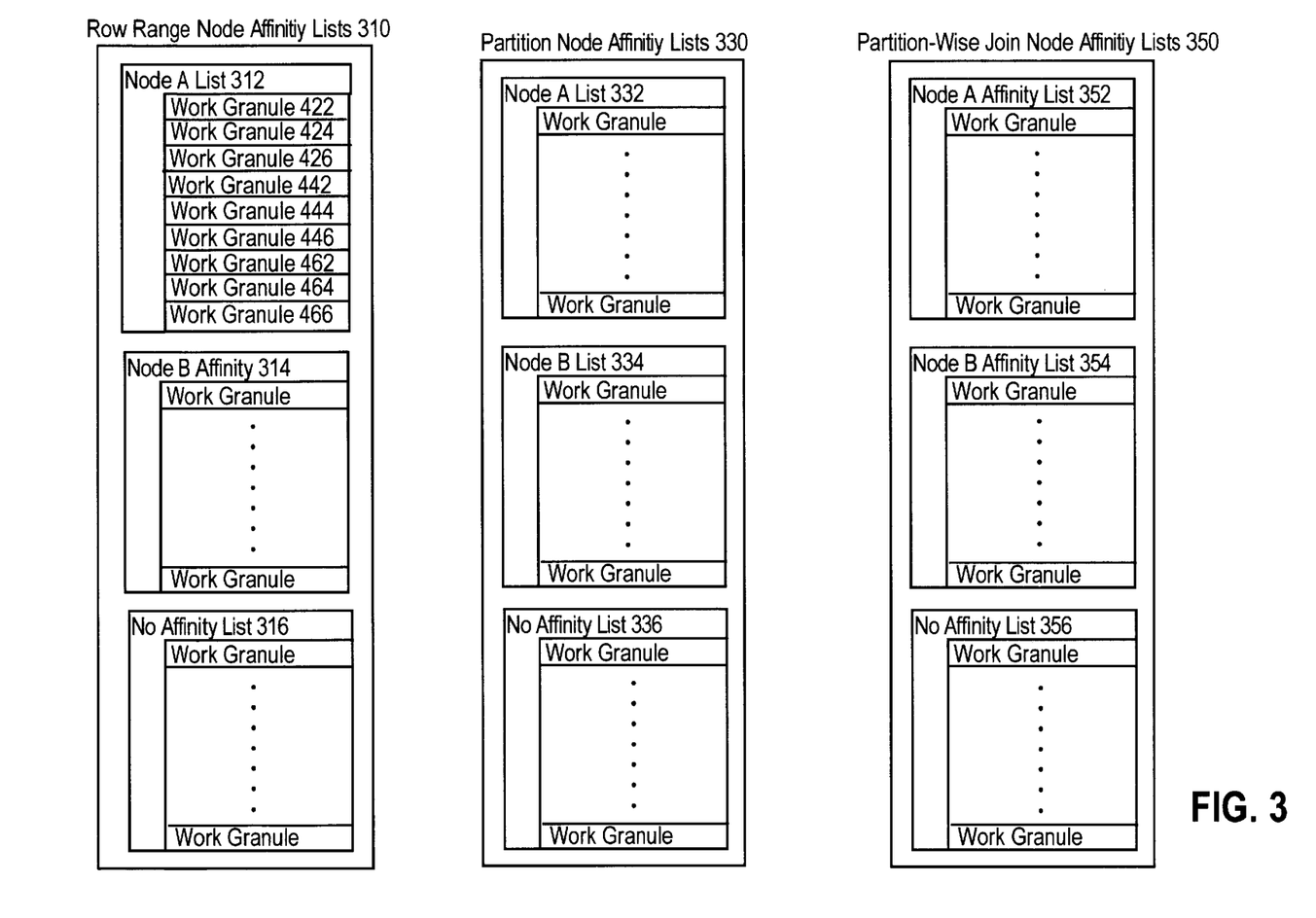
FIG. 3 is a flowchart depicting data object work granule lists organized by work granule Type.

Establishing the affinity of the work granules entails determining the affinity of each of the work granules, and generating data that specifies the affinity of the work granules. FIG. 3 shows various node affinity lists that are generated to indicate the affinity of the work granules, according to an embodiment of the invention.

FIG. 3 is a block diagram that depicts node affinity lists used to indicate the affinity of work granules relative to nodes. As used herein, a node affinity list is a list of work granules that have each been established as having an affinity to the same node, or have been established as having no particular affinity for any node.

A set of node affinity lists is created for each work granule type. Block range node affinity lists 310 is an illustrative set of node affinity lists for the block range work granule type. Node A affinity list 312 and node B affinity list 314 contain the work granules that have been established as having an affinity for node A 102 and node B 110, respectively. No affinity list 316 is a list of work granules that have been established as having no affinity for any particular node. Each node affinity list contains a list of work granules. For example, node A affinity list 312 includes work granules 422, 424, 426, 442, 444, 446, 462, 464, and 466.

Partition node affinity List 330 includes a set of node affinity lists for the partition work granule type, and includes node A affinity list 332, node B affinity list 334, and no affinity list 336. Partition-wise join node affinity list 350 includes a set of node affinity lists for the partition work granule type, which includes node A affinity list 352, node B affinity list 354, and no affinity list 356.

Establishing What Data Objects Work Granules Access

The data objects that must be accessed to perform a task are referred to herein as the "target data objects" of the task. According to one aspect of the invention, the work granules of a task are distributed to slave processes in a manner that attempts to cause the target data objects of the task to be accessed by the same number of slave processes. To distribute the work granules in this manner, data is generated to indicate which work granules access which data objects. Specifically, each node affinity list is organized into target data object lists. Each target data object list is associated with a particular data object and contains a list of the work granules that access the particular data object. The data object may reside on a set of disks that is local or remote to the node with which the work granule has an affinity.

Figure 4:
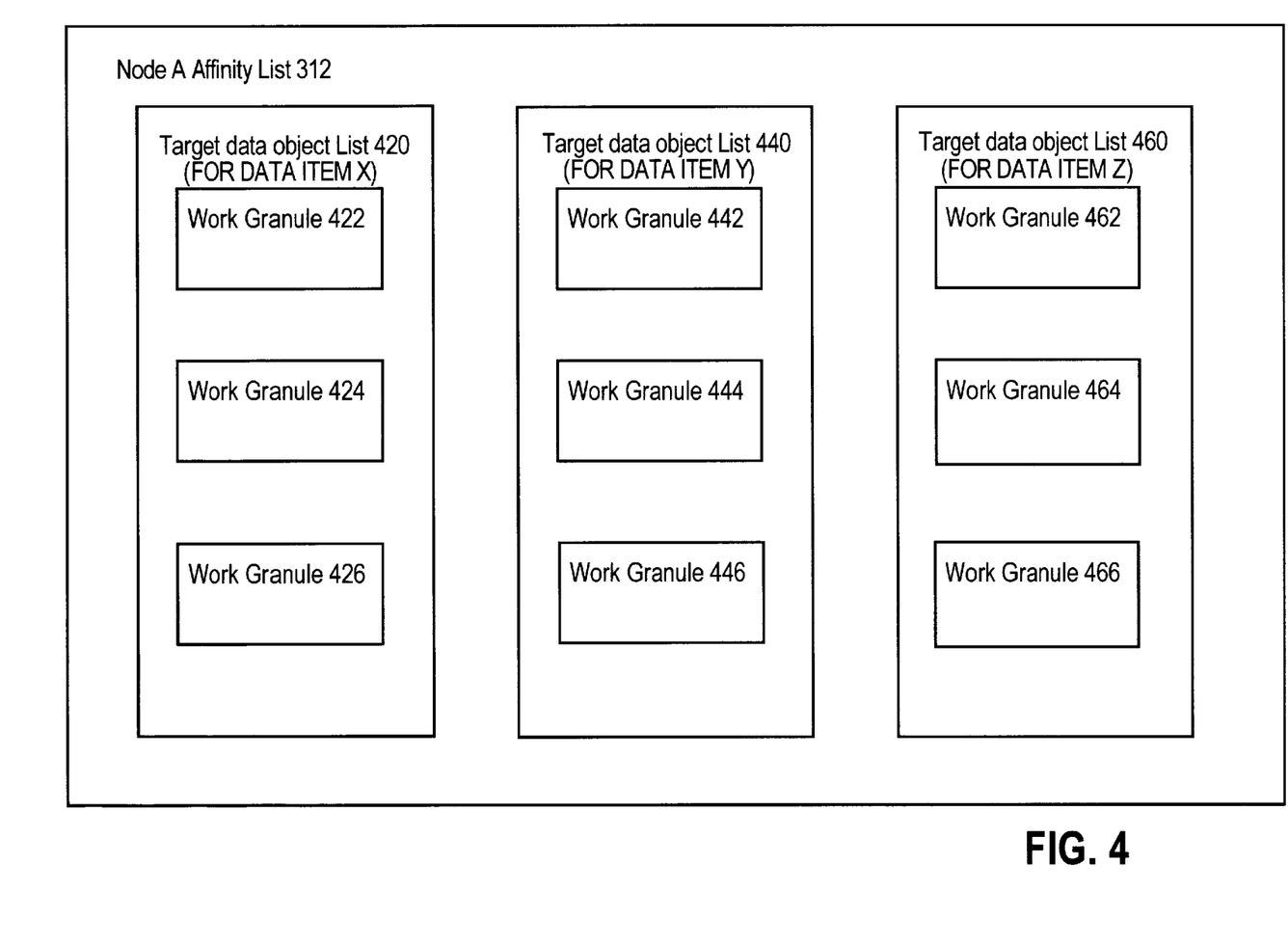
FIG. 4 is a flowchart depicting data object work granule lists that organize work granules according to the data objects accessed by the work granules.

FIG. 4 shows a set of target data object lists according to an embodiment of the present invention. Referring to FIG. 4, node A affinity list 312 includes target data object list 420, target data object list 440, and target data object list 460. Target data object lists 420, 440, and 460 contain lists of work granules that access data objects X, Y, and Z, respectively. In particular, target data object list 420 is associated with data object X. Target data object list 420 lists work granules 422, 424, and 426, thereby indicating that work granules 422, 424 and 426 access data object X. Similarly, target data object list 440 is associated with data object Y and lists work granules 442, 444, and 446, thereby indicating that work granules 442, 444 and 446 access data object Y. Target data object list 460 is associated with data object Z and lists work granules 462, 464, and 466, thereby indicating that work granules 462, 464, and 466 access data object Z.

To organize the work granules that belong to a node affinity list into target data object lists, information is needed about which data objects are accessed by which work granules. This information may be obtained by examining the work assigned to each work granule to determine what database objects a work granule accesses, and examining database metadata to determine what data objects contain those database objects. For example, in an implementation that distributes work based on file access, the work assigned to a work granule would be inspected to determine the database object that the work granule accesses, and the database metadata would be examined to determine the file that contains that database object.

Assigning Work Granules to Evenly Distribute Workload between Data Objects

Figure 5:
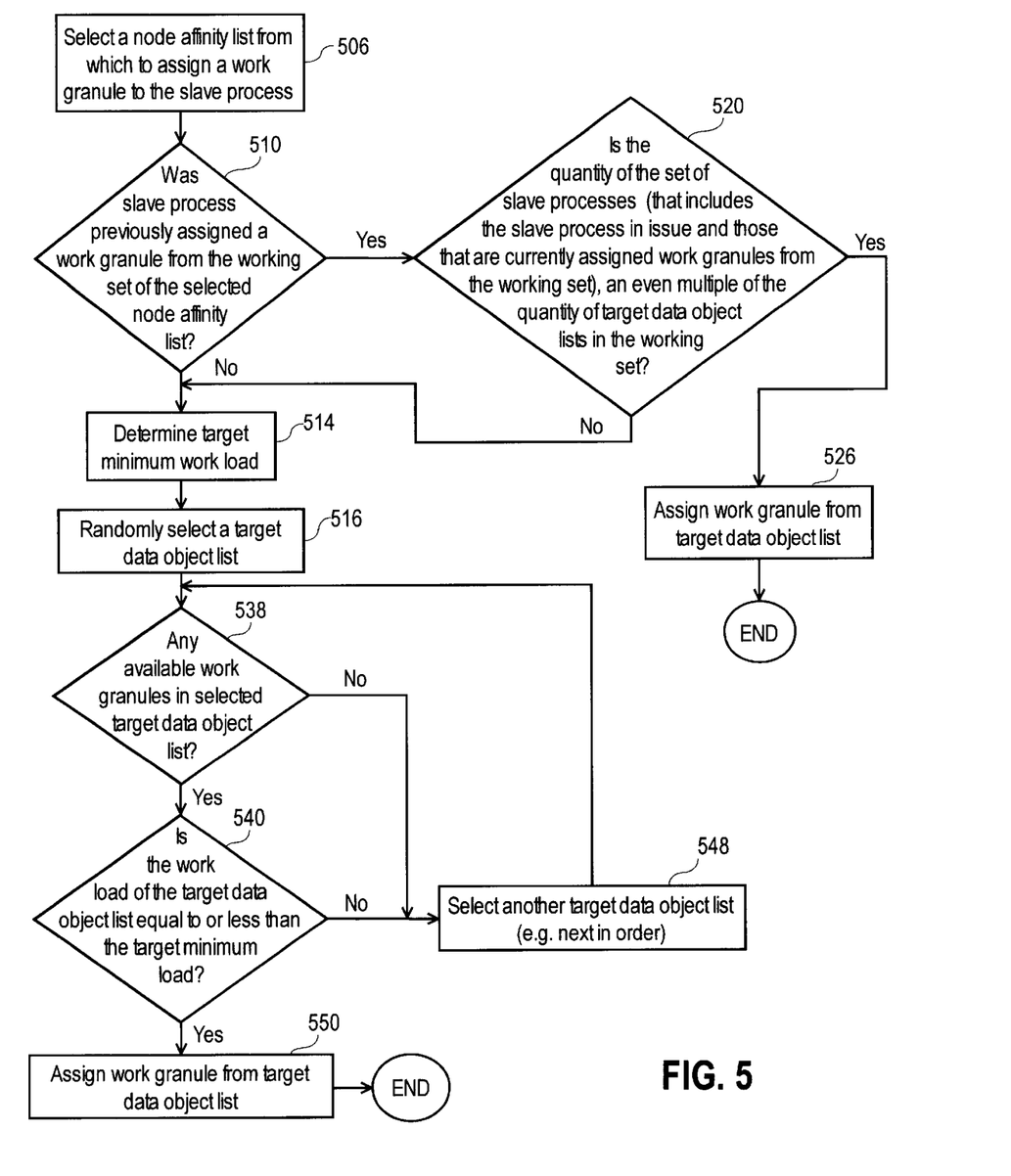
FIG. 5 is a flowchart depicting a process for dynamically balancing the workload placed on the data objects and the resources used to access the data objects.

To execute the work granules of a task, a set of slave processes are assigned to execute the work granules that are in the node affinity list associated with a work granule type. In an example used to illustrate how work granules are assigned to slave processes, slave processes A, B, and C are assigned to execute the work granules from block range node affinity lists 310. FIG. 5 shows a process for distributing work granules to slave processes in an manner that attempts to cause the target data objects to be accessed by the same number of slave processes. The process is performed to assign to a slave process the appropriate work granule from the set of currently available work granules in node affinity lists associated with a work granule type.

Referring to FIG. 5, at step 506, a node affinity list ("selected node affinity list") is selected for the slave process to be assigned a work granule. A node affinity list is selected according to the following rule:

(1) Select a node affinity list with currently available work granules with an affinity for the node of the slave process, if there is no such node affinity list, then (2) select a no affinity list, if there is no such node affinity list, then (3) select a node affinity list with currently available work granules with an affinity for nodes other than the node of the slave process.

In this example, slave process A has an affinity for node A. Thus, node A affinity list 312 is selected.

The term "working set" is used herein to refer to the set of target data object lists of a selected node affinity list that are associated with available work granules. An available work granule is a work granule that has not been assigned to any slave process for execution. The steps are illustrated using target data object lists 420, 440, and 460, which are associated with the selected node A affinity List 312, and which are respectively associated with data objects X, Y and Z. Initially, the working set includes target data object lists 420, 440, and 460 because none of the work granules has been assigned for execution to a slave process, and hence all work granules are available to be assigned to a slave process for execution. Once all the work granules for the target data object list have been assigned to a work granule, the target item data list has no work granules, and the target item data list no longer belongs to the working set.

At step 510, it is determined whether the work granule previously assigned to the slave process was from the set of target data object lists in the working set of the selected node affinity list. If the work granule previously assigned to the slave process was from the set of target data object lists in the working set, then control flows to step 514. Otherwise, control flows to step 520. In this illustration, slave process A has not yet been assigned any work granule from node A affinity list 312. Therefore, control flows to step 514.

At step 514, a "target minimum load" is calculated. According to an embodiment, the target minimum load is the minimum number of slave processes that are currently assigned to a work granule from the working set. In other words, the "minimum target load" for a node affinity list is the number of currently executing work granules that belong to the target data object list, within the node affinity list, that has currently available work granules and that has the least number of currently executing work granules.

In the current illustration, the target minimum load is zero because no slave process is currently assigned a work granule from the node A affinity list 312. Another example of how minimum load is calculated is useful. For purposes of illustration, four slave processes are executing work granules assigned to them from target data object lists in the working set of node A affinity list 312. When a slave process completes its work granule, a work granule from each of target data object lists 420, 440, and 460 is being executed by the remaining three slave processes. The process depicted in FIG. 5 is invoked. At step 514, the target minimum load determined is 1 because one work granule from each of target data object lists 420, 440, and 460 is being executed.

At step 516, a target data object list from the working set is selected at random. In the current illustration involving slave process A, target data object list 460 is selected at random.

At step 538, it is determined whether there are any available work granules remaining in the target data object list. If there are not any available work granules, then control flows to step 548. Because there are available work granules in target data object list 460, control flows to step 540.

At step 540, it is determined whether the workload of the selected target data object list is equal to or less than the target minimum load. The workload of a data object is the quantity work granules assigned from the data object that are currently assigned to slave processes for execution. In the current illustration, there are no other work granules that are currently assigned for execution, and in particular, there is no work granule from the selected target data object list 420 assigned to a slave process. Therefore, the work load of the data object is zero, which equals the target minimum load. Control therefore flows to step 550.

At step 550, a work granule from target data object list 420 is assigned. In the current illustration, work granule 422 is assigned. Execution of steps shown in FIG. 5 ends.

Continuing with the current illustration, the process in FIG. 5 is invoked to assign a work granule for slave process B. As a result, slave process B is assigned work granule 442 from target data object list 440. The process is invoked once again to assign a work granule to slave process C. Execution proceeds to step 514.

At step 514, the target minimum load determined is 0 because no work granule from target data object list 460 is currently assigned to a work granule. At step 516, target data object list 440 is selected at random. At step 540, it is determined that the workload of target data object list 440 is greater than 0 because one work granule is currently assigned to slave process B. Control flows to step 548.

At step 548, another target data object list is selected according to an order associated with target data object lists 420, 440, and 460. The target data object list selected is the one next in the order after the currently selected target data object list. For example, to track target data object lists 420, 440, and 460, an array of references that each refer to target data object lists 420, 440, and 460 is used. The order associated with target data object lists 420, 440, and 460 may be the order of their respective references in the array. In the current illustration, target data object list 460 is selected.

At step 540, it is determined that the current workload of target data object list 560 is equal to target minimum workload of zero. At step 550, work granule 462 is assigned to slave process C.

After a period of time, slave process A completes execution of work granule 422. Work granule 422 is then unassigned, and the process depicted in FIG. 5 is invoked to assign another work granule to slave process A.

Sometimes a slave process can only be assigned a work granule from the data object list from which the slave process was previously assigned a work granule. This condition occurs when the only target data object list that has a work load equal to the target minimum work load is the data object list from which the slave process was previously assigned a work granule. Steps 510 and 520 are an optimization for quickly detecting when this condition may exist.

At step 510, because the slave process had been previously assigned work granule 424 from target data object list 420, it is determined that the work granule previously executed by the slave process was assigned to the slave process from the working set. Therefore, control passes to 520.

At step 520, it is determined whether the quantity of "working-on-this-node" processes is an even multiple of the quantity of data object lists in the working set of the selected node affinity list. The "working-on-this-node" processes include (1) those slave processes that are currently assigned work granules from the working set of the selected node affinity list, and (2) the slave process for which the work granule selection is being performed. If the quantity of "working-on-this-node" processes is an even multiple of the quantity of data object lists in the working set of the selected node affinity list, then the slave process is assigned a work granule from the target data object list from which the process was previously assigned a work granule.

In the current illustration, target data object lists 420, 440, and 460 are in the working set of node A affinity list 312 because all have available work granules. Slave processes B and C have been assigned work granules 442 and 462 from target data object lists 440 and 460, respectively. Thus, the quantity of working-on-this-node slave processes is three. Three is an even multiple of the quantity of data objects in the working set of the selected node affinity list, which is also 3. Hence, target data object list 420 may be the only data object with a workload equal to the target minimum workload. Thus, control flows to step 460, where work granule 424 from target data object list 420 is assigned to slave process A.

By assigning a work granule from a target data object list whose load matches the target minimum threshold, workload is increased for a data object with the least load, and the workload is distributed more evenly between the data objects. Selecting a target data object list randomly not only tends to balance the load between data objects, but between resources that, although used when accessing the data objects, are unknown to the coordinator process responsible for assigning work granules (e.g. disk controllers). The random selection of a data object tends to reduce the placement of unbalanced loads on resources whose load a coordinator process cannot track and direct.

In addition, selecting a data object randomly avoids having to select the data object according to an order. An order may have a biased distribution for a particular resource used to access a data object. Assigning work granules according to a biased order may lead to a resource contention. For example, a working set may include target data object lists for data object A1, A2, A3, and B1, B2, and B3. Unknown to coordinator process 104, data objects A1, A2, and A3 are controlled by disk controller A and data objects B1, B2, and B3 are controlled by disk controller B. If the work granules are assigned from target data object lists in an order that corresponds to A1, A2, and A3, and B1, B2, and B3, slave processes A, B, and C will initially be assigned to data objects that are accessed through the same disk controller, disk controller A. Selecting a target data object list randomly reduces the probability of unintentional resource contention that would otherwise result from assigning work granules according to an order biased toward a particular set of resources.

Managing Slave Processes of Multiple Tasks

The techniques for balancing the number of slave processes that access a set of data objects have been illustrated in a manner that accounts only for the set of slave processes assigned to execute a single query. However, a set of data objects may be accessed concurrently by slave processes executing the work granules of other queries or tasks. According to an embodiment of the present invention, the work granules are distributed to slave processes so that data objects are accessed in a balanced manner that accounts for the work granules of multiple tasks. Thus, a data object list may include work granules from different tasks, or a data object may have multiple lists, each list including work granules from one task. The work load of a data object includes the slave processes executing the different tasks, and the working set includes data objects with an available work granule from any of the different tasks.

Hardware Overview

Figure 6:
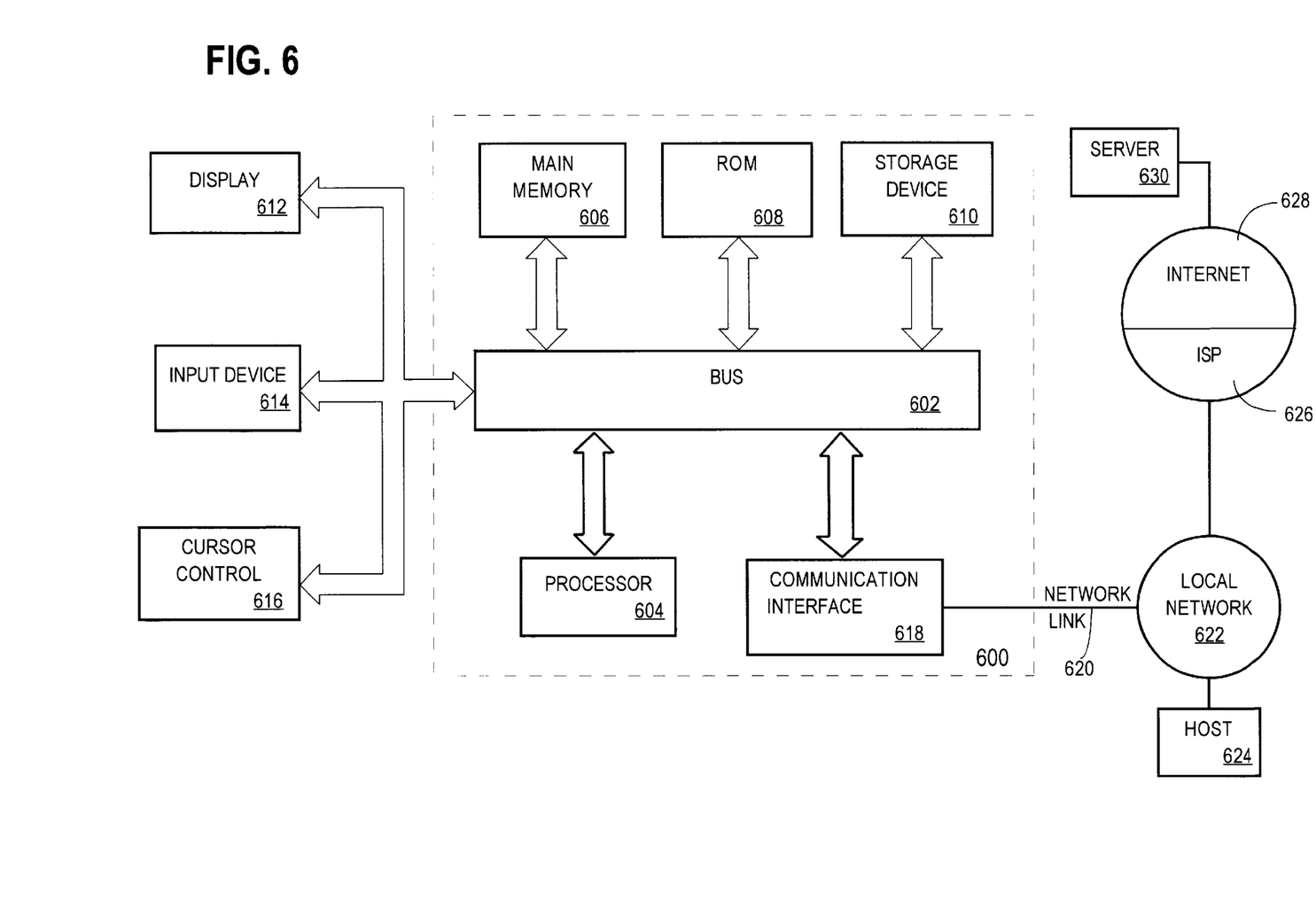
FIG. 6 is a block diagram depicting a computer system upon which an embodiment of the present invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for distributed workload between resources used to access a data object. According to one embodiment of the invention, for distributed workload between resources used to access a data object is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for distributed workload between resources used to access a data object as described herein.

The received code may be executed by processor 604 as it is received, and/or stored in storage device 610, or other non-volatile storage for later execution. In this manner, computer system 600 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for managing contention for data objects that are accessed during execution of one or more tasks, the method comprising the steps of:

dividing said one or more tasks into work granules;

determining a set of data objects that must be accessed during execution of the work granules; and selecting which work granule from a plurality of currently unassigned work granules of said one or more tasks to assign to a process based on:
   (a) how many processes are currently accessing each data object in said set of data objects, and
   (b) the data object associated with each of said currently unassigned work granules.

2. The method of claim 1, wherein:

the step of determining a set of data objects includes selecting a subset of said set of data objects; and the step of selecting which work granule includes selecting which work granule from a plurality of currently unassigned work granules of said one or more tasks to assign to a process based on:
   (a) how many processes are currently accessing each data object in said subset of data objects, and
   (b) the data object from said subset of data objects associated with each of said currently unassigned work granules.

3. The method of claim 2, wherein the step of selecting a subset of said set of data objects includes:

identifying a node on which said process executes; and determining whether a subset of data objects will be accessed during the execution of at least one currently unassigned work granule that has an affinity for said node; and if a subset of data objects will be accessed during the execution of at least one currently unassigned work granule that has an affinity for said node, then selecting a currently unassigned work granule that has an affinity for said node.

4. The method of claim 3, further including performing, if a subset of data objects will not be accessed during the execution of at least one currently unassigned work granule that has an affinity for said node, the steps of determining whether a subset of data objects will be accessed during the execution of at least one currently unassigned work granule that has no affinity for any node; and if a subset of data objects will be accessed during the execution of at least one currently unassigned work granule that has no affinity for any node, then selecting a currently unassigned work granule that has no affinity for any node.

5. The method of claim 4, further including performing, if a subset of data objects will not be accessed during the execution of at least one currently unassigned work granule that has no affinity for any node, the step of selecting a currently unassigned work granule that has an affinity for another node.

6. The method of claim 1, wherein each data object from said set of data objects is associated with a load that represents a number of processes currently assigned a work granule that requires access to said each data object, wherein the step of selecting which work granule includes:

determining a target load of processes that is equal to a minimum load of any data object from said set of data objects that is accessed by currently unassigned work granules;

selecting a data object, accessed by at least one work granule from said plurality of currently unassigned work granules, that has a load not greater than said target load; and selecting to assign to said process a currently unassigned work granule that accesses said data object.

7. The method of claim 6, wherein the step of selecting a data object includes:

randomly selecting a data object from said set of data objects;

determining whether the load for said data object is not greater than said target load; and wherein the step of selecting to assign to said process is performed when said load for said data object is not greater than said target load.

8. The method of claim 6, further including the step of selecting another data object from said set of data objects that has a load that is not greater than said target load when said load for said data object is greater than said target load.

9. The method of claim 6, wherein the plurality of processes has a quantity of processes, the method further including the steps of:

in response to said process completing execution of a particular work granule, determining that the quantity of processes is an even multiple of a quantity of work granules in a set of work granules, wherein said set of work granules consists of the particular work granule and any uncompleted work granules currently assigned to said plurality of processes; and in response to determining that the quantity of processes is an even multiple, assigning another currently unassigned work granule that accesses said data object.

10. The method of claim 8, wherein said set of data objects is associated with an order, wherein the step of selecting another data object includes selecting a data object that is next in order and that has a load not greater than said target load.

11. The method of claim 1, wherein:

the step of dividing said one or more tasks includes dividing a task into a subset of work granules based on database partitions that will be accessed during execution of said subset of work granules; and the step of determining a set of data objects that must be accessed during execution of the work granules includes determining a set of data objects accessed by said subset of work granules.

12. The method of claim 1, wherein said processes include processes executing work granules from multiple tasks.

13. A computer-readable medium carrying one or more sequences of one or more instructions for managing contention for data objects that are accessed during execution of one or more tasks, the one or more sequences of one or more instructions including instructions which, when executed by one or more processors, cause the one or more processors to perform the steps of:

dividing said one or more tasks into work granules;

determining a set of data objects that must be accessed during execution of the work granules; and selecting which work granule from a plurality of currently unassigned work granules of said one or more tasks to assign to a process based on:
 (a) how many processes are currently accessing each data object in said set of data objects, and
 (b) the data object associated with each of said currently unassigned work granules.

14. The computer-readable medium of claim 13, wherein:

the step of determining a set of data objects includes selecting a subset of said set of data objects; and the step of selecting which work granule includes selecting which work granule from a plurality of currently unassigned work granules of said one or more tasks to assign to a process based on:
 (a) how many processes are currently accessing each data object in said subset of data objects, and
 (b) the data object from said subset of data objects associated with each of said currently unassigned work granules.

15. The computer-readable medium of claim 14, wherein the step of selecting a subset of said set of data objects includes:

identifying a node on which said process executes; and determining whether a subset of data objects will be accessed during the execution of at least one currently unassigned work granule that has an affinity for said node; and if a subset of data objects will be accessed during the execution of at least one currently unassigned work granule that has an affinity for said node, then selecting a currently unassigned work granule that has an affinity for said node.

16. The computer-readable medium of claim 15, further including sequences of instructions for performing, if a subset of data objects will not be accessed during the execution of at least one currently unassigned work granule that has an affinity for said node, the steps of determining whether a subset of data objects will be accessed during the execution of at least one currently unassigned work granule that has no affinity for any node; and if a subset of data objects will be accessed during the execution of at least one currently unassigned work granule that has no affinity for any node, then selecting a currently unassigned work granule that has no affinity for any node.

17. The computer-readable medium of claim 16, further including sequences of instructions for performing, if a subset of data objects will not be accessed during the execution of at least one currently unassigned work granule that has no affinity for any node, the step of selecting a currently unassigned work granule that has an affinity for another node.

18. The computer-readable medium of claim 13, wherein each data object from said set of data objects is associated with a load that represents a number of processes currently assigned a work granule that requires access to said each data object, wherein the step of selecting which work granule includes:

determining a target load of processes that is equal to a minimum load of any data object from said set of data objects that is accessed by currently unassigned work granules;

selecting a data object, accessed by at least one work granule from said plurality of currently unassigned work granules, that has a load not greater than said target load; and selecting to assign to said process a currently unassigned work granule that accesses said data object.

19. The computer-readable medium of claim 18, wherein the step of selecting a data object includes:

randomly selecting a data object from said set of data objects;

determining whether the load for said data object is not greater than said target load; and wherein the step of selecting to assign to said process is performed when said load for said data object is not greater than said target load.

20. The computer-readable medium of claim 18, further including the step of selecting another data object from said set of data objects that has a load that is not greater than said target load when said load for said data object is greater than said target load.

21. The computer-readable medium of claim 18, wherein the plurality of processes has a quantity of processes, the computer-readable medium further including sequences of instructions for performing the steps of:

in response to said process completing execution of a particular work granule, determining that the quantity of processes is an even multiple of a quantity of work granules in a set of work granules, wherein said set of work granules consists of the particular work granule and any uncompleted work granules currently assigned to said plurality of processes; and in response to determining that the quantity of processes is an even multiple, assigning another currently unassigned work granule that accesses said data object.

22. The computer-readable medium of claim 20, wherein said set of data objects is associated with an order, wherein the step of selecting another data object includes selecting a data object that is next in order and that has a load not greater than said target load.

23. The computer-readable medium of claim 13, wherein:

the step of dividing said one or more tasks includes dividing a task into a subset of work granules based on database partitions that will be accessed during execution of said subset of work granules; and the step of determining a set of data objects that must be accessed during execution of the work granules includes determining a set of data objects accessed by said subset of work granules.

24. The computer-readable medium of claim 13, wherein said processes include processes executing work granules from multiple tasks.

* * * * *